United States Patent [19]

Aillet

[11] 3,920,919

[45] Nov. 18, 1975

[54] DEVICE FOR CHECKING A MULTIPLEX DIGITAL TRAIN

[75] Inventor: Claude Aillet, Lannion, France

[73] Assignee: Compagnie Industrielle des Telecommunications Cit-Alcatel, France

[22] Filed: July 2, 1974

[21] Appl. No.: 485,261

[30] Foreign Application Priority Data

July 3, 1973 France .............................. 73.24429

[52] U.S. Cl. .......................... 179/15 BS; 179/15 BF

[51] Int. Cl.² ........................................... H04J 3/06

[58] Field of Search........ 179/15 BF, 15 BS, 15 BV, 179/15 AF; 178/69.5 R

[56] References Cited

UNITED STATES PATENTS

| | | | |
|---|---|---|---|
| 3,564,414 | 2/1971 | Ebert | 179/15 AF |
| 3,652,802 | 3/1972 | Schellenberg | 178/69.5 R |
| 3,725,591 | 4/1973 | Palombari | 179/15 BS |
| 3,749,839 | 7/1973 | Fornasiero | 179/15 BV |

*Primary Examiner*—Ralph D. Blakeslee
*Attorney, Agent, or Firm*—Craig & Antonelli

[57] ABSTRACT

The invention comes within the branch of data transmission comprising the multiplexing of *k* digital unitary trains of rhythms substantially equal into a single digital train having a rhythm substantially *k* times faster than the unitary trains and the reverse demultiplexing. It concerns a device enabling the checking of multiplexing/demultiplexing operations by comparison between a word having a determined length sampled in a (slow) unitary train and a word having the same length sampled in the (rapid) multiplexed train.

12 Claims, 2 Drawing Figures

DEVICE FOR CHECKING A MULTIPLEX DIGITAL TRAIN

Figure 1A:
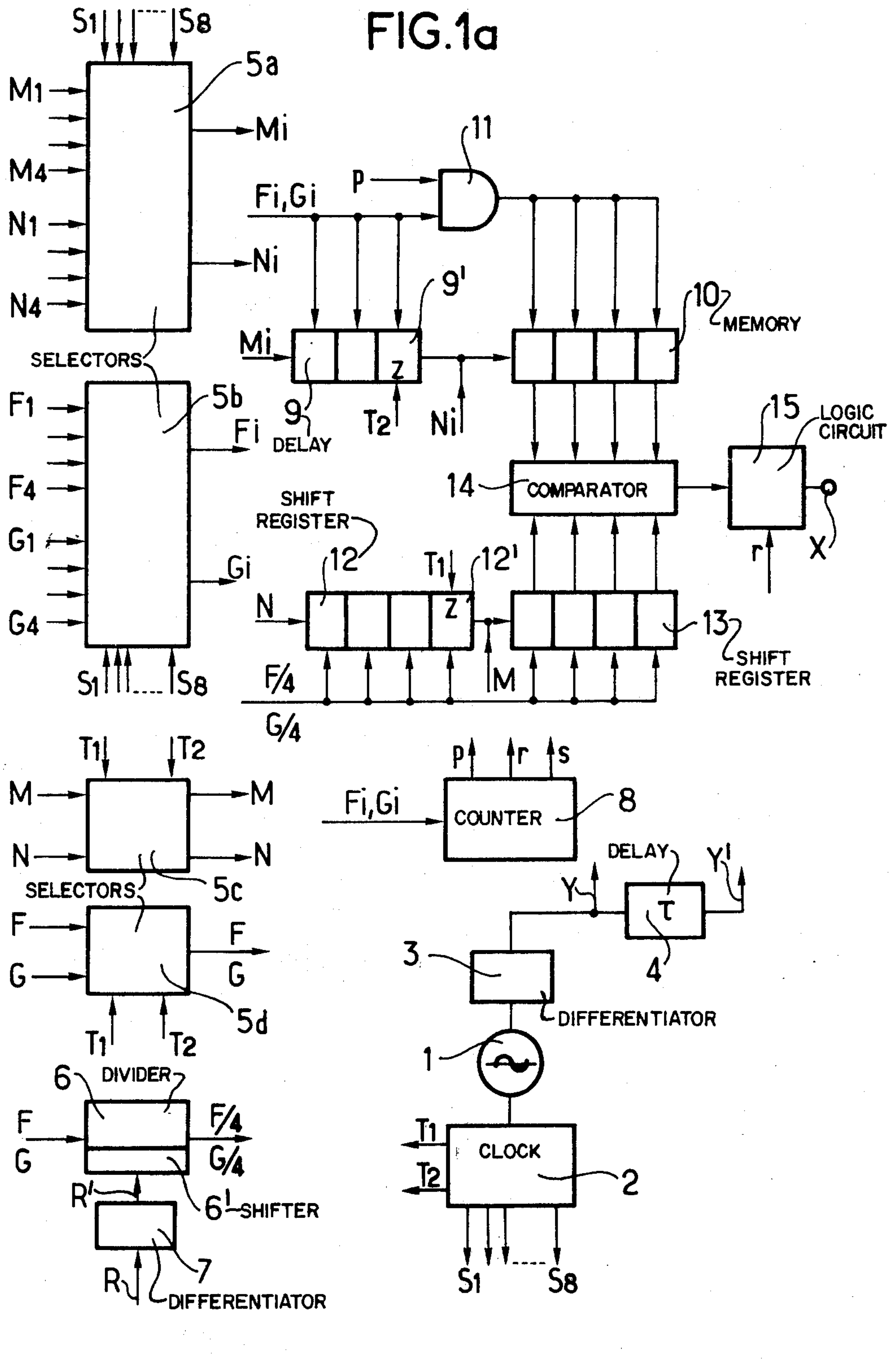

The invention concerns the branch of data transmission comprising the multiplexing of $k$ unitary digital trains having rhythms which are substantially equal into a single digital train having a rhythm substantially $k$ times faster than the unitary trains, and the reverse demultiplexing. Particularly, a device is provided enabling the checking of the multiplexing/demultiplexing operations in comparison between a word having a determined length sampled in a (slow) unitary train and a word having the same length sampled in the (rapid) multiplexed train.

The invention applies to the controlling of the multiplexers and demultiplexers in the industrial application of data transmission by digital trains.

The multiplexing/demultiplexing operations between a train known as "rapid" and $k$ trains known as "slow", effected in data transmission, occur in the following conditions:

A multiplexer receives $k$ digital trains (to give a clear idea, it will be assumed, here, that $k = 4$). Each of these trains, designated hereinbelow by M$i$, where $i = 1, 2, 3$ or 4, is received with its individual rhythm, F$i$. These rhythms all have the same rated value, for example, F$i$ = 6.339 Mc/s, but they are not synchronized; they are therefore not all strictly equal. The multiplex (rapid) train M has a rhythm F which has a frequency slightly greater then four times a rhythm F$i$, for example F = 25.885 Mc/s, a quarter of which is in the vicinity of 6.471 Mc/s, hence greater than F$i$ = 6.339 Mc/s. Such a difference is necessary, due to the absence of synchronization between the in-coming slow trains.

That difference imposes the inserting in the multiplex train of extra bits, called insertion bits, so as to harmonize the rhythms as much as possible. They take up determined positions in the multiplex train, which contains also a frame blocking word.

A demultiplexer receives a rapid multiplex train (N), having a rhythm G and four slow unitary trains (N$i$) having individual rhythms G$i$, which must be free from the insertion bits and from the blocking word.

These elements are therefore relatively complex and their operation must be surveyed permanently.

To survey or check the operation of the multiplexer, an auxiliary demultiplexer could be used and an auxiliary multiplexer could be used for checking the demultiplexer, but due to the absence of synchronization between the trains, such a method would be complicated and expensive.

The surveying of a demultiplexer may also be effected by a demultiplexer in parallel.

The method is complicated and expensive, for the surveying device is as complex as the surveyed device: Indeed, a surveying multiplexer-demultiplexer comprises channel synchronization cards, general transmitting elements (time base and multiplexing), general receiving elements (time base, locking search system, demultiplexing) and channel desynchronization cards.

The checking demultiplexer must comprise general receiving elements and a channel desynchronization card, besides the switching circuits (channel selectors).

The invention operates by simpler means consisting in sampling, for example on an input train of the multiplexer, M$i$, a word containing $q$ bits (for example $q = 4$) stored in a fixed memory and in comparing it with a word containing $q$ bits extracted from the rapid train M one time in four of the rhythm F (rhythm F/4). If the rhythm F/4 is properly timed, the comparator should indicate a coincidence. If the rhythm F/4 is not properly timed, the lack of coincidence observed at the output of the comparator triggers an order for shifting the rhythm F/4 as many times as is necessary for obtaining coincidences. The repeated lack of coincidence means a breakdown state of the multiplexer.

The checking of the demultiplexer is effected exactly in the same way, making the necessary changes between the rapid input train N, whose rhythm is G, from which are sampled a word whose rhythm is G/4, and a four-bit word of a slow output train N$i$, stored in a memory.

The lack of synchronization between the rhythm imposes, for the comparison, the immobilizing of at least one of the two words.

The device checks in a cyclic manner and indefinitely the multiplexer, then the demultiplexer, etc. It derives its rhythm from a time base whose frequency is $f = 500$ c/s, supplying individual times having a duration of 2 milliseconds, called selection times. During a cycle having eight selection moments, called a "major cycle", having a duration of 16 ms, the four trains M$i$ are checked with respect to the (multiplexer) train M, then the four trains N$i$ are checked with respect to the (demultiplexer) train N, etc.

Eight advance times of a slow rhythm (F$i$ or G$i$) constitute a minor cycle. During the the first four times of a minor cycle, a four-bit word of one of the trains, M$i$ or N$i$, is inserted in a memory (shift register); during the following four times of the minor cycle, the fixed word in the memory is compared on passing with a four-bit word which passes through another shift register at the rhythm F/4 or G/4 respectively.

There are about 1600 minor cycles in a selection moment. The first minor cycles of a selection moment are devoted to the search for and checking of the timing of the dividing up into four of a rapid rhythm (F or G), according to the results of the comparator. Once the correct timing is obtained and confirmed, the device changes over automatically into the position called error check position, where a defect in the coincidence at the output of the comparator is recorded in an alarm counter.

If, at the end of a selection moment, the device has not passed into the error check position, an alarm is also set off, for that situation indicates a breakdown of the surveyed equipment, no shifting of the rhythm F/4 of G/4 being able to supply coincidences at the output of the comparator.

An example of embodiment of the invention will be described in detail with reference to the accompanying FIGS. 1*a* and 1*b*, which should be consulted together.

As oscillator 1, whose frequency is equal to 500 c/s, for example, energizes a time base 2, which comprises essentially a module 8 counter, which supplies eight selection moments, S1 . . . S8, which form a major cycle lasting 16 milliseconds.

The time base 2 also supplies two signals: T1 which is equal to 1 during a half of the major cycle, T2 which is equal to 1 during the other half of the major cycle.

At the end of each selection time, a differentiator circuit 3 supplies a short pulse Y. A short pulse Y' is emitted a few microseconds after the pulse Y, under the effect of a delay line 4.

A first selector 5a receives at its input, four digital input trains M1 . . . M4 from a multiplexer, (not shown) and four digital output trains N1 . . . N4 from a demultiplexer (not shown) and receives, moreover, on the selection terminals, the selection moments S1 . . . S8, acting as selection orders for their respective durations.

During a selection moment S*i* (comprised between 1 and 4) the selector 5a selects the train M*i*. During a selection moment S*j* (*j* being comprised between 5 and 8), the selector 5a selects a train N*i*.

A second selector 5*b*, whose constitution and operation are identical to those of the selector 5*a*, receives the rhythms F1 . . . F4 of the trains M1 . . . M4, respectively, the rhythms G1 . . . G4 of the moments N1 . . . N4, respectively and selects them individually during the times S1 . . . S8 according to the same diagram as the selector 5*a* for the corresponding trains.

A third selector 5*c* receives at its input the trains M and N and checks the signals T1 and T2 thereof and supplies at its output either the train M and during T1, or the train N during T2.

Likewise, a fourth selector 5*d*, built in the same way as the selector 5*c*, supplies at its output either the rhythm F during T1, or the rhythm G during T2.

The configuration of the selectors has not been shown in detail; however, it comprises essentially AND gates.

The notations at the input of the selectors represent incident trains or rhythms, the notations at the output represent selected trains or rhythms.

A divider-by-four 6 receives at its input either the rhythm F or the rhythm G and supplies at its output, respectively F/4 or G/4. The divider 6 is fitted with a built-in shift means 6', which, under the effect of a short pulse R', may make a pulse jump by an incoming rhythm. Such shift elements of a pulse counter operating like a clock are well-known and do not require a detailed description.

The short pulse R' is emitted by a differentiator element 7, which receives a shift order R.

The element 8 is a counter which receives either a rhythm F*i* or rhythm G*i*, selected by 5*b* during a major cycle, and defines a minor cycle comprising eight rhythm moments. The element 8, which comprises essentially a module 8 counter, supplies a signal *p*, equal to 1 during one half of a minor cycle and to 0 during the other half, as well as two different signals *r* and *s*, each lasting one rhythm moment.

A memory 10 having a capacity of four bits, stores a four-bit word sampled either on a train M*i* (selection moment S1 to S4) or on a train N*i* (selection moment S5 to S8). The memory 10 is, to great advantage, built in the form of a shift register having four flip-flops. The storing in the memory is effected according to the following process:

A train M*i* leaving 5*a* during a selection moment S*i* is applied to the input of a delay line 9 lasting three rhythm moments. The delay line 9 is, to great advantage, built in the form of a shift register having three flip-flops. The advantage line of the shift register 9 receives directly the rhythm F*i;* the advance line of the shift register 10 receives the rhythm F*i* through an AND gate 11, which is operated by the signal *p*. During a half of the minor rhythm (signal $p = 1$) the data passes through the register 10; during the other half ($p = 0$), the word written in the register 10 remains fixed.

On the other hand, a train N*i* is applied directly during an instant S*i* to the input of the register 10. The difference in connection between a train M*i* (input of the multiplexer) and a train N*i* (output of the multiplexer) is due to the operating time of the multiplexer, which requires that difference in treatment.

The output flip-flop 9' of the register 9 is maintained at zero during the interval T2 of the major cycle, by the applying of the signal T2 on a terminal Z for the resetting to zero of the flip-flop 9'.

The resetting to zero of 9' during T2 acts so as to enable the applying of N*i* to the input of 10; that connection corresponds to a "cabled OR".

Similarly, the output of the multiplexer M is applied to the input of a shift register 13 having four flip-flops and the input train of the demultiplexer N is applied to the input of a shift register 12 placed at the head of the shift register 13, the difference in connection being justified by the operation time of the demultiplexer. Just as above, the last flip-flop 12' of the register 12 is kept at zero during one half cycle of the major cycle, but here during the interval T1.

The advance line of the registers 12 and 13 receives the rhythm F/4 during one half of the major cycle, or the rhythm G/4 during the other half of the major cycle, these two rhythms being obtained at the output of the divider 6 dividing by 4.

A digital comparator 14, of any known type, comprising, for example, EXCLUSIVE OR circuits, receives, on the one side, a fixed four-bit word contained in the register 10 during the interval of four advance moments ($p = 0$), and on the other side, a four-bit word passing through the register 13 in accordance with the rhythm F/4 or G/4, respectively.

A logic circuit 15 for recopying and reading the output signal of the comparator 14 comprises essentially a buffer-memory and a reading circuit, and transfers the output signal of the comparator 14 at a point X under the control of a signal *r* whose duration is equal to an advance moment. The reading is effected during the major cycle which follows the comparison. Such an element is well-known in the logic circuit technique and does not require any detailed description.

The logic signal transferred at X is a 1 when there is a lack of coincidence at the comparator 14.

Figure 1B:
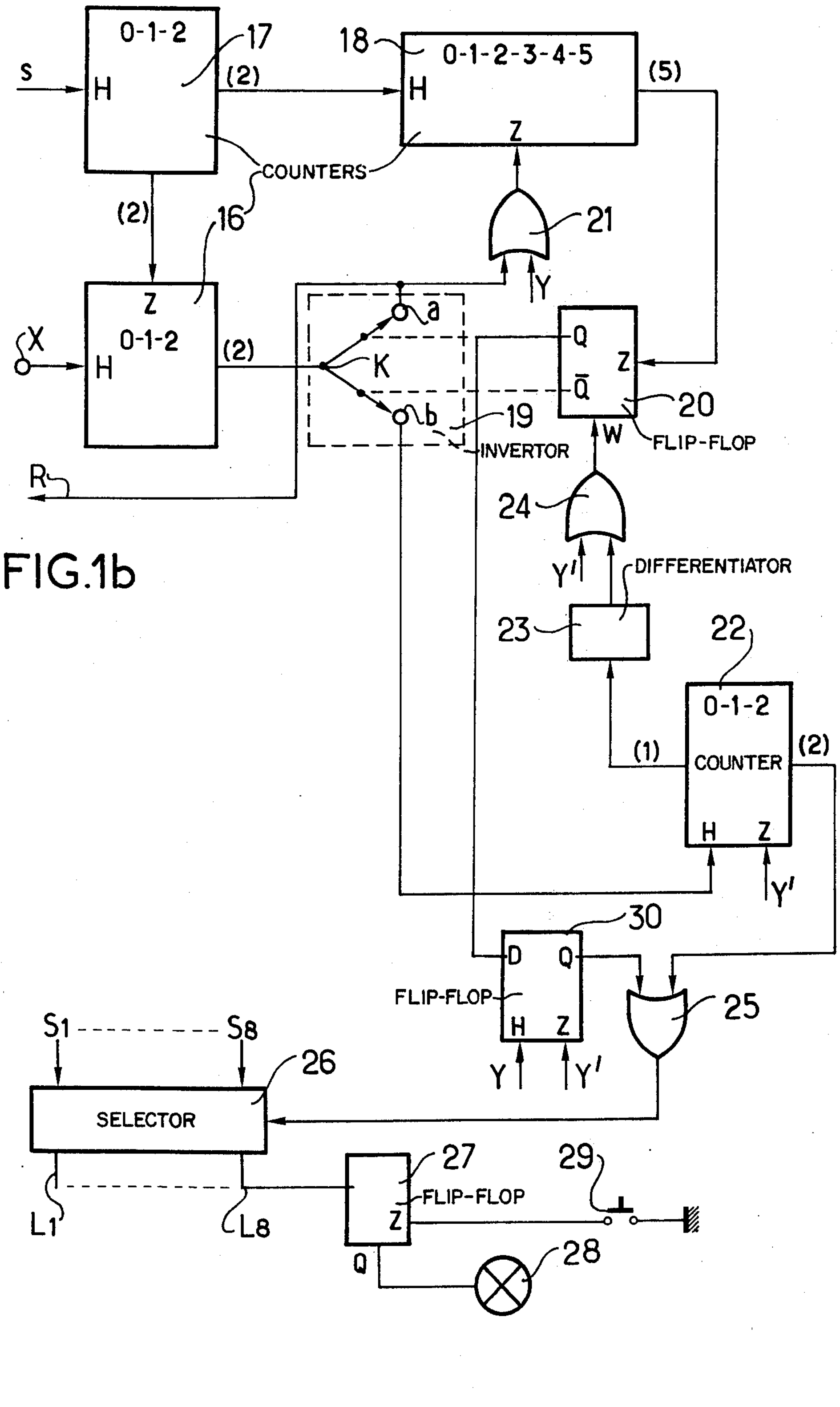

The point X connected to the point H, clock input of a module 3 counter 16 (states 0, 1, 2), functioning as a majority detector operating on three words, as is illustrated in FIG. 1*b*.

That majority detection is effective if only one of the three words may be cut into two by one or several insertion bits. This entails a minimum distance between the groups of insertion bits.

The counter 16 is connected with another module 3 counter 17 (states 0, 1, 2), which receives at its clock input H, a signal *s* coming from the clock 8 once per minor cycle. The state 2 of the counter 17 is applied to the clock input H of a module 6 counter 18 (states 0, 1, 2, 3, 4, 5), and the counter 18 functions as element for checking the timing of the divider 6 dividing-by-4.

The counter 16 is reset to zero by the appearance, at a terminal Z of a signal 2, which is simultaneous with the output signal 2 of the counter 17, but shorter.

The state 2 of the counter 16 is applied to the common point K of an invertor 19 having two positions *a, b*, which is operated by a bistable flip-flop 20 having two outputs, Q and $\overline{Q}$. Where Q = 1, the invertor 19 is in the position *a;* where $\overline{Q} = 1$, the invertor 19 is in the position *b*.

In the position $a$, the point K is connected to the terminal for the resetting Z of the counter 18 to zero through an OR circuit 21. The counter 18 may also be reset to zero by a signal Y applied to the OR circuit 21.

The state 2, reaching a, constitutes the signal R (see above). In the state $\overline{Q} = 1$ of the flip-flop 20, the point K is connected up to $b$ to the input H of a module 3 counter 22 (states 0, 1, 2). The counter 22, which is an alarm counter, is reset to zero by the signal Y' applied to its terminal Z. The state 2 of the counter 22 is applied to an alarm selector 26 through an OR circuit 25.

The alarm selector 26 receives the selection moments S1 . . . S8, as well as the alarm signal leaving 25.

It comprises eight outputs L1 . . . L8; each of which is equipped with a flip-flop such as 27, which is an alarm memory, one of whose outputs Q may light up an indicator lamp 28 and may be set to zero for example by means of ground connected through a manual control means 29.

The state 1 of the counter 22 is applied to a differentiator circuit 23 whose output is applied through an OR circuit 24 to a terminal for resetting W of the flip-flop 20 to 1. The OR circuit 24 also receives the signal Y'.

The output Q of the flip-flop 20 is also connected to the terminal D of a D-type flip-flop 30, one of whose outputs Q is applied to the OR circuit 25. The flip-flop 30 receives, on a terminal H, a reading pulse Y and on a terminal Z, a pulse Y' for resetting to zero.

OPERATION. At the beginning of a selection moment, the flip-flop 20 is a 1 (Q = 1), the inverter 19 is in the position $a$.

If the counter 16 has counted at least two lacks of coincidence during a period of three minor cycles, counted by the counter 17, this is an indication of a faulty timing of the rhythm F/4 or G/4. The signal 2 appearing at a supplies a signal R, which triggers a shifting order R' for the divider 6 dividing-by-4.

The timing check counter 18 increases by one unit at each state 2 leaving the counter 17, that is, every three minor cycles. Nevertheless, it is reset to zero by the appearance of a signal R at $a$. It is also reset to zero by the signal Y at the end of each selection time.

The appearance of the state 5 at the output of the counter 18 applies an order for the resetting to zero of the flip-flop 20; the invertor then assumes the position $b$.

If a state 2 then appears at K, the alarm counter 22 changes over from 0 to 1.

Nevertheless, as a precaution, that first defect observed by the majority detector 16 is not immediately taken into account. The passing to the state 1 of the counter 22 triggers, through the differentiator circuit 23, an order for resetting the flip-flop 20 back to 1; a new timing check is effected. If, after a further satisfactory timing check, the counter 22 which retains the state 1 records a further defect, it passes to the state 2; an alarm is then indicated by the alarm selector 26.

The alarm counter 22 is reset to zero by the signal Y' at the end of the selection moment.

The capacity of the counter 18, fixed here at 5, is not critical. It must give a good certainty of the correctness of the picking up. That certitude is all the better as the capacity is greater, but if the capacity is greatly increased, the check takes more time in a selection moment and decreases by as much the duration of the defect counting phase.

Nevertheless, if the multiplexer or demultiplexer operates in an abnormal way, the counter 18 will never reach the full capacity 5 during the selection moment; the alarm counter 22 will remain at zero, since the flip-flop 20 remains at 1 (Q = 1). To take into account that possibility, which obviously requires the sending out of an alarm, the state of the flip-flop 20 is recopied at the end of the selection moment by the D-type flip-flop 30 which is interrogated at the end of the selection moment by the signal Y and reset to zero by the signal Y'.

Where Q is 20 = 1, also, Q in 30 = 1 between signals Y and Y' and an alarm is registered in the alarm selector 26.

While we have shown and described several embodiments in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

What is claimed is:

1. A device for checking the correspondence between a rapid multiplex digital train and digital non-synchronized rhythm trains about $k$ times slower, said device comprising:

memory means for storing a first word of a predetermined number of bits $q$, said first word sampled on one of $k$ slow input trains $M_i$ having a rhythm $F_i$ of a multiplexer and $k$ slow output trains $N_i$ having a rhythm $G_i$ of a demultiplexer;

divider means for dividing by $k$ a rapid rhythm F of a rapid output train M of said multiplexer and a rapid rhythm G of a rapid input train N of said demultiplexer;

first register means for providing a second word of said predetermined number of bits $q$, said second word being sampled on said rapid train at said rapid rhythm;

comparison means for comparing said first and second words for coincidence during a predetermined selection time;

timing control means for controlling the timing of said rapid rhythm divided by $k$ as a function of a lack of coincidence in said comparison means to achieve coincidence, said timing control means providing a timing regulation mode;

error checking means for detecting errors in said coincidence of said first and second words during said predetermined selection time, said error checking means providing an error checking mode; and alarm indicating means for indicating an alarm signal representative of at least one of said error in said coincidence and a failure to achieve a coincidence during said predetermined selection time.

2. A device according to claim 1, wherein said timing control means includes a first counter means for receiving a signal from the output of said comparison means and a second counter means for counting repetitive intervals of said predetermined selection time, said first counter means operating as a major detector of said lack of coincidence in connection with said second counter means.

3. A device according to claim 2, wherein said timing control means further includes switch means for alternatively switching between a first and second operating position respectively providing said timing regulation mode and said error checking mode, said switch means receiving a signal from said first counter means representative of a predetermined number of lack of coincidences.

4. A device according to claim 3, wherein said timing control means further includes a third counter means for checking the timing of said rapid rhythm divided by *k* in response to a signal from said second counter means, said third counter means having a greater capacity than said first and second counter means, and said third counter means being reset to zero when said switch means is in said first operating position.

5. A device according to claim 4, wherein said switch means includes a first flip-flop means for controlling said switch means, said first flip-flop means being set to zero when said third counter means is at full capacity such that said switch means is changed from said first operating position to said second operating position.

6. A device according to claim 5, wherein error checking means includes a fourth counter means for resetting said first flip-flop means to 1 upon receipt by said fourth counter means of a predetermined lack of coincidence signal when said switch means is in said second operating position to effect a new timing check.

7. A device according to claim 6, wherein said alarm signal is indicated when said fourth counter means receives a lack of coincidence signal subsequent to said predetermined lack of coincidence signal.

8. A device according to claim 7, wherein said first flip-flop means has an output connected to a control input of a second flip-flop means, said second flip-flop means being interrogated by a predetermined pulse emitted at the end of said selection time, and said second flip-flop being reset to zero by a second pulse slightly delayed from said predetermined pulse to actuate said alarm indicating means if said first flip-flop has maintained its state during said selection time.

9. A device according to claim 1, wherein said error check means includes circuit means for reactivating said timing control means at a first occurring error in said coincidence, and further including means for resuming said error checking mode upon a second occurring error.

10. A device according to claim 1, wherein said memory means includes a shift register means having *q* flip-flops, the advance line of said shift register means being blocked after filling of said shift register means.

11. A device according to claim 9, wherein each of said memory means and said first register means are preceded by delay means, said delay means respectively receiving said slow input train M*i* of said multiplexer and said rapid input train N of said demultiplexer.

12. A device according to claim 11, wherein said slow output train N*i* of said demultiplexer is applied to said advance line of said shift register means, and said rapid output train M of said multiplexer is applied to the advance line of said first register means.

* * * * *